(12) United States Patent
Viavant

(10) Patent No.: US 7,761,914 B2
(45) Date of Patent: Jul. 20, 2010

(54) METHOD AND APPARATUS FOR FACILITATING ADJUSTMENT OF AN AUDIT STATE IN A COMPUTING ENVIRONMENT

(75) Inventor: Steven Viavant, Piedmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1307 days.

(21) Appl. No.: 11/255,464

(22) Filed: Oct. 21, 2005

(65) Prior Publication Data
US 2007/0094141 A1 Apr. 26, 2007

(51) Int. Cl.
G06F 12/14 (2006.01)
H04L 29/06 (2006.01)
G06F 11/30 (2006.01)
G06F 21/00 (2006.01)

(52) U.S. Cl. .............. 726/22; 726/23; 726/24; 726/25; 709/223; 709/224; 709/225; 713/150; 713/164; 713/166; 713/188; 705/50

(58) Field of Classification Search .............. 726/22–25; 705/50; 713/188, 150, 164, 166; 709/223–225
See application file for complete search history.

(56) References Cited

U.S. PATENT DOCUMENTS

| 5,931,946 | A * | 8/1999 | Terada et al. ................ 726/25 |
|---|---|---|---|
| 6,408,391 | B1 * | 6/2002 | Huff et al. .................... 726/22 |
| 6,845,453 | B2 * | 1/2005 | Scheidt et al. ................ 726/5 |
| 6,889,210 | B1 * | 5/2005 | Vainstein ..................... 705/57 |
| 6,931,356 | B2 * | 8/2005 | Bauchot ..................... 702/188 |
| 7,480,797 | B2 * | 1/2009 | McKee ....................... 713/164 |
| 7,530,103 | B2 * | 5/2009 | Willman et al. .............. 726/21 |
| 7,627,893 | B2 * | 12/2009 | Corley et al. ................. 726/3 |
| 2002/0095572 | A1 * | 7/2002 | Frank et al. ................ 713/166 |
| 2004/0049696 | A1 * | 3/2004 | Baker et al. ................ 713/201 |
| 2004/0143750 | A1 * | 7/2004 | Kulack et al. .............. 713/200 |
| 2004/0177266 | A1 * | 9/2004 | Moyer et al. ............... 713/200 |
| 2004/0250098 | A1 * | 12/2004 | Licis .......................... 713/193 |
| 2006/0248599 | A1 * | 11/2006 | Sack et al. ................... 726/27 |

\* cited by examiner

Primary Examiner—William R Korzuch
Assistant Examiner—Trang Doan
(74) Attorney, Agent, or Firm—Park, Vaughan & Fleming LLP

(57) ABSTRACT

One embodiment of the present invention provides a system that facilitates adjusting an audit state in a computing environment. During operation the system receives a key from a third-party at an audit system. Note that the key is associated with a corresponding audit-control profile. Next, the system validates the key, thereby authenticating the third-party. The system then identifies the audit-control profile that is associated with the key provided by the third-party. Finally, the system audits the target system in accordance with the corresponding audit-control profile.

20 Claims, 4 Drawing Sheets

METHOD AND APPARATUS FOR FACILITATING ADJUSTMENT OF AN AUDIT STATE IN A COMPUTING ENVIRONMENT

BACKGROUND

1. Field of the Invention

The present invention relates to computer systems. More specifically, the present invention relates to a method and apparatus for facilitating adjustment of an audit state in a computing environment.

2. Related Art

Auditing is a powerful mechanism for the enforcement of security policies, and for system evaluation. A system administrator can use an auditing mechanism to detect inappropriate and malicious behavior. Moreover, auditing can help identify the perpetrators of such activities. Furthermore, auditing can help system administrators detect flaws in system design, and can facilitate improvements to the design.

When an auditing mechanism comes under the control of an adversary, the auditing mechanism can be used to attack the system that the auditing mechanism is meant to protect. For example, if the auditing mechanism is configured to audit everything that can be audited at the highest level of detail possible, then it is possible for the system to use so much of its resources performing auditing operations that the system is unable to perform other operations. Such malicious use of an auditing mechanism as described above is a form of a denial of service (DoS) attack, which can be devastating in many situations.

The opposite situation can also be detrimental. If an adversary gains control of the auditing mechanism, the adversary can turn off all auditing. In such a situation, no further actions will be recorded, and therefore no record of a subsequent attack will be generated. Therefore, it is important to prevent control of the auditing mechanism from falling into the wrong hands.

However, it is often desirable to have a third-party system initiate auditing when certain pre-defined conditions are met. This is advantageous because the administrator has one less system to be responsible for monitoring. In order to enable the third-party system to initiate auditing, the system administrator typically provides a key to the third-party system which enables the third-party system to change audit settings. This allows the third-party system to take over some of the auditing. However, providing such control to the third-party system creates potential problems because the probability that an unauthorized individual can obtain an audit system key increases each time the key is shared with an authorized third-party.

Hence, what is needed is a method for controlling system auditing capabilities that does not give rise to the above-mentioned problems.

SUMMARY

One embodiment of the present invention provides a system that facilitates adjusting an audit state in a computing environment. During operation the system receives a key from a third-party at an audit system. Note that the key is associated with a corresponding audit-control profile. Next, the system validates the key, thereby authenticating the third-party. The system then identifies the audit-control profile that is associated with the key provided by the third-party. Finally, the system audits the target system in accordance with the corresponding audit-control profile.

In a variation of this embodiment, the audit-control profile can specify: a system to be audited; a step size indicating an amount of change by which an audit-level can be altered; a maximum level to which an audit can be increased; a minimum level to which an audit-level can be decreased; a direction indicating if an audit-level can be increased, decreased, or both; a time-to-live indicator that specifies a maximum life-time of a change to an audit-control profile; a key giving access to change the audit-control profile; and any other audit-control related information.

In a further variation, the time-to-live indicator can include: a period of time; a number of operations; or any other countable measure.

In a variation of this embodiment, if the key is a "master key," the key provides unlimited control over the audit-control profile.

In a variation of this embodiment, the third-party is one of: an individual; a computer system; a computer application; or a threat-detection system.

In a variation of this embodiment, the third-party receives the key from an administrator.

In a variation of this embodiment, the audit-control profile can specify a call to a third-party process such as an e-mail client to notify an administrator of a modification to the audit-control profile.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device that can store code and/or data for use by a computer system. This includes, but is not limited to, magnetic and optical storage devices such as disk drives, magnetic tape, CDs (compact discs) and DVDs (digital versatile discs or digital video discs), and any other type of storage devices.

Overview

The present invention provides a method for facilitating the adjustment of audit state in a computing environment. Typically, if an administrator wants to provide a third-party with the capability to adjust the audit state of a computing environment, then the administrator gives an audit system key to the third party. This audit system key allows the third party to adjust the audit state in any manner that is desired by the third party. The present invention restricts the changes that the third party can make to the audit-control profile thereby making it more difficult for an adversary to hide his or her actions. By restricting such changes, the present invention removes one avenue for Denial of Service (DoS) attacks.

In one embodiment of the present invention, when an audit system receives a request to change the audit-control profile, the audit system checks to see if the request is from an authorized party. If so, the audit system retrieves the audit-control profile which is associated with the key used by the party making the request. This key can include a password, or any form of cryptographic key used in a cryptographic system.

One embodiment of the present invention restricts changes to the audit-control profile to enforce the administrator's pre-defined guidelines. For example, a party can only choose to audit systems that the administrator has defined in the audit-control profile. The administrator can specify that a party can only increase the audit-level by a predefined step size up to a predefined maximum. The administrator can also restrict the length of time that any changes a party makes to an audit-control profile are effective. These examples demonstrate the ability of the present invention to restrict audit-control profile changes to facilitate the prevention of DoS attacks, or unauthorized termination of audit processes.

Computing Environment

Figure 1:
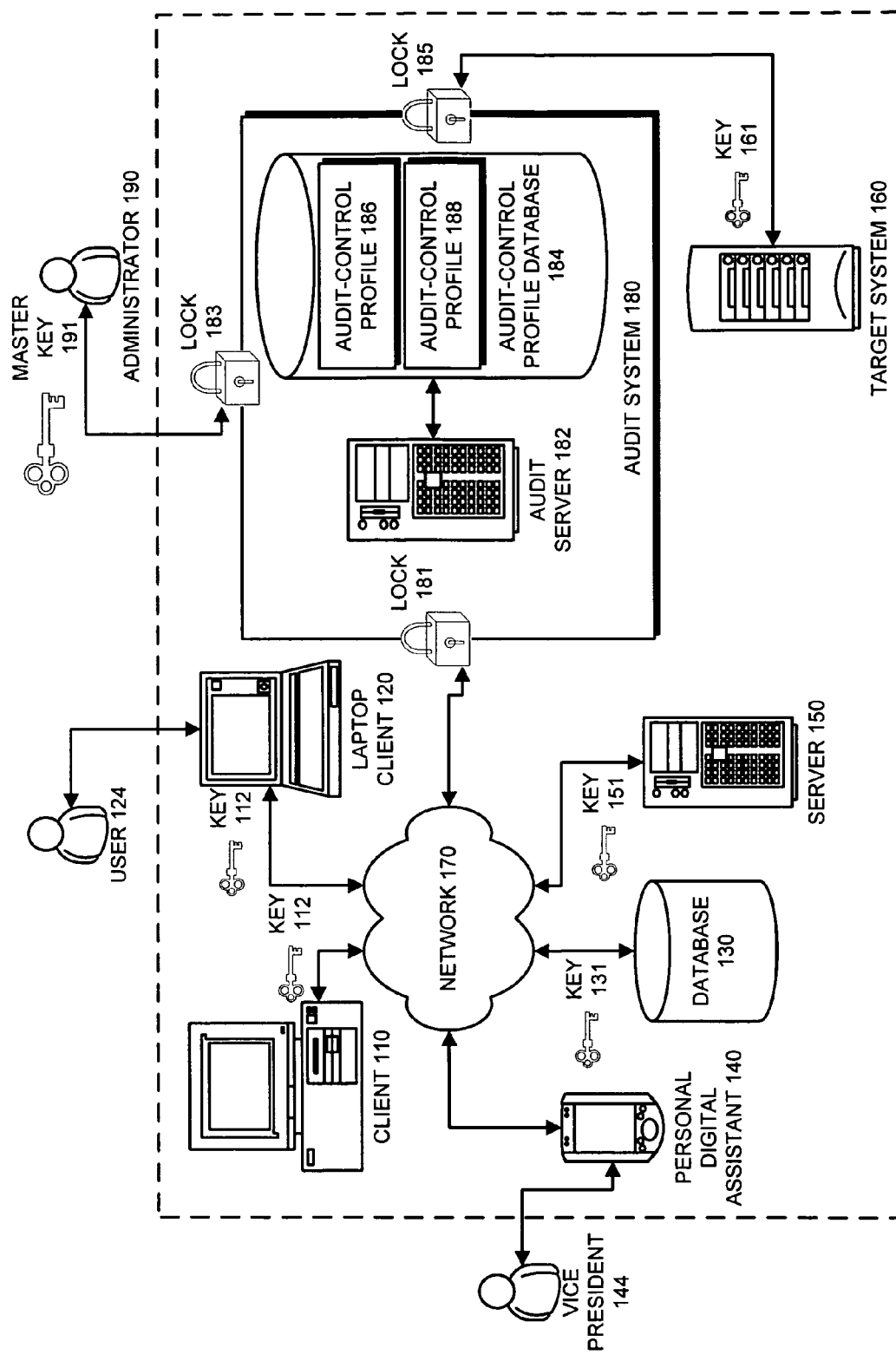
FIG. 1 illustrates a computing environment in accordance with an embodiment of the present invention.

FIG. 1 illustrates a computing environment 100 in accordance with an embodiment of the present invention. Computing environment 100 can generally include any type of computer system, including, but not limited to, a computer system based on a microprocessor, a mainframe computer, a digital signal processor, a portable computing device, a personal organizer, a device controller, and a computational engine within an appliance. Computing environment 100 includes client 110, laptop client 120, database 130, personal digital assistant 140, server 150, and target system 160, all of which communicate to audit system 180 either directly, by way of network 170, or by way of one of the aforementioned devices.

Client 110 and laptop client 120 can generally include any node on a network including computational capability and including a mechanism for communicating across the network.

Database 130 can include any type of system for storing data in non-volatile storage. This includes, but is not limited to, systems based upon magnetic, optical, and magneto-optical storage devices, as well as storage devices based on flash memory and/or battery-backed up memory.

Personal digital assistant 140 can generally include any hand-held device containing computational ability. This includes, but is not limited to, cellular phones, digital personal organizers, and personal electronic devices.

Server 150 can generally include any computational node including a mechanism for servicing requests from a client for computational and/or data storage resources.

Network 170 can generally include any type of wired or wireless communication channel capable of coupling together computing nodes. This includes, but is not limited to, a local area network, a wide area network, or a combination of networks. In one embodiment of the present invention, network 170 includes the Internet.

Audit system 180 can generally include any type of system that performs auditing of a user action, or a system operation. Note that audit system 180 may or may not be contained within target system 160. Audit system 180 contains audit server 182 and audit-control profile database 184. Audit-control profile database 184 contains audit-control profiles 186 and 188.

Target system 160 can generally include any type of computer system, including, but not limited to, a computer system based on a microprocessor, a mainframe computer, a digital signal processor, a portable computing device, a personal organizer, a device controller, and a computational engine within an appliance.

In one embodiment of the present invention, administrator 190 defines audit-control profile 186 and 188 which are stored in audit-control profile database 184. When one of the devices that make up computing environment 100 receives an event that triggers the need for a change in the current audit state, the device, such as client 110, contacts audit system 180. For example, client 110 could be a threat-detection system. Upon identifying a possible intrusion, client 110 could decide to increase the audit-level of target system 160. For any changes requested by client 110 to be accepted, administrator 190 must provide client 110 with a key that is associated with one of the audit-control profiles.

In one embodiment of the present invention, any of the devices illustrated in FIG. 1 can represent the target system.

Each device in the computing environment has a key which is used to authenticate the device with the audit system and furthermore associates the device with the audit-control profiles that they have permission to modify. In FIG. 1 these keys are 112, 131, 151, 161, and master key 191. Master key 191 is used by the administrator to access the audit system. When using master key 191, the administrator has full control over all of the audit-control profiles. In other words, the administrator can create, modify and delete any and all audit-control profiles when authenticated with master key 191. Note that key 112 is duplicated in FIG. 1 in order to demonstrate that devices can share keys and thus share control over an audit-control profile.

In one embodiment of the present invention, a key can be assigned to a user instead of, or in addition to a device.

In one embodiment of the present invention, a device cannot choose to share a key. In this embodiment, administrator 190 assigns all of the keys and therefore only administrator 190 can decide whether a device should share a key and its associated audit-control profile.

Locks 181, 183, and 185 illustrate the idea that for a device to access audit system 180 the device must possess a key assigned by administrator 190. Without a key, a device cannot make any changes to an audit-control profile stored within audit-control profile database 184.

In one embodiment of the present invention, user 124 decides to increase the audit-level on server 150. To do so, user 124 uses laptop client 120 which has been assigned key 112 to adjust the audit-level setting of audit-control profile 186. Note that in this embodiment, any adjustment to an audit-control profile that affects server 150 causes a notification to be sent to personal digital assistant 140 which is owned by vice president 144.

Audit-Control Profile

Figure 2:
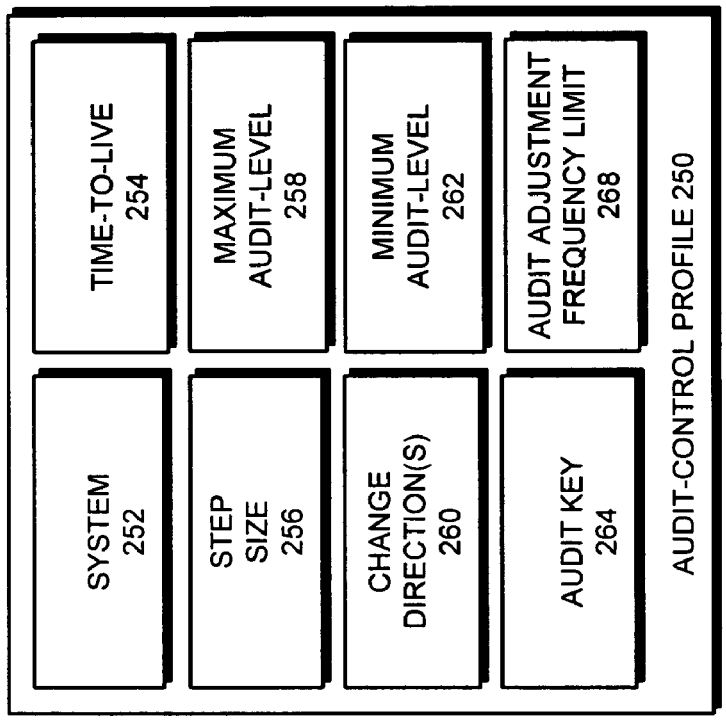
FIG. 2 illustrates a number of audit-control profiles in accordance with an embodiment of the present invention.
Figure 2:
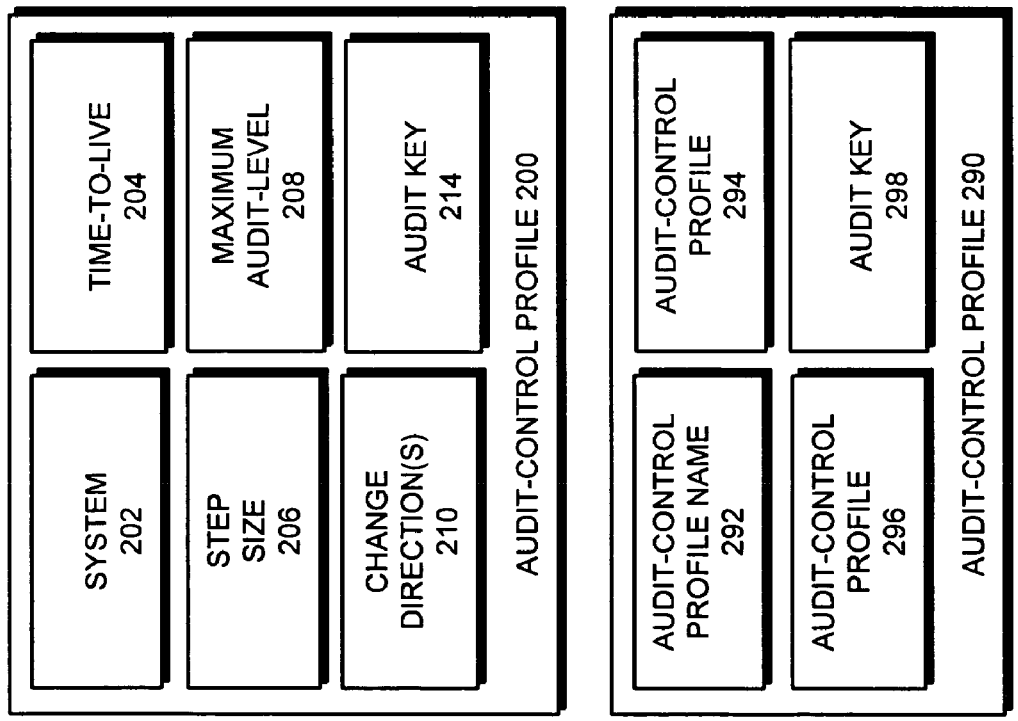

FIG. 2 illustrates a number of audit-control profiles in accordance with an embodiment of the present invention. Each audit-control profile defines various properties which in turn determine what systems are audited and to what level of detail they are audited.

In the example illustrated in FIG. 2, audit-control profile 200 identifies system 202 as the system that is to be audited, wherein system 202 can be any system within the computing environment. Time-to-live 204 specifies a limit on how long an adjustment made to the audit-control state will be effective. This boundary is beneficial in preventing DoS attacks because it prevents a device from increasing the audit-level of a system for an inordinate amount of time.

Step size 206 defines the size of the increments that an audit-level can be adjusted by and is used in concert with maximum audit-level 208 to prevent excessive auditing. Moreover, step size 206 can also include a setting that controls how many increments an audit-level can be adjusted by in one audit-state adjustment. Furthermore, audit-level adjustments can be expressed in both relative and absolute terms, but regardless of how the audit-level adjustment is expressed, the lesser change from the current level is the adjustment which is accepted. For example, assume the current audit-level is level five, the maximum audit-level allowed is level ten, and the step size allows an increase of at most three steps relative to the current level, wherein one level is equivalent to one step. In one adjustment, the maximum the audit-level can be adjusted to is level eight. However, if the current audit-level is level eight, then the maximum that the audit-level can be adjusted to is level ten.

Whether auditing can be increased, decreased, or both is controlled by the change direction(s) 210 property. By defining the change direction(s) 210 property to only allow an increase in auditing, the administrator can guarantee that an individual cannot turn off auditing in order to hide nefarious activities.

Audit key 214 associates a key with the audit-control profile. Using audit key 214, the administrator can associate devices and audit-control profiles with each other. Note that any form of cryptography can be selected by the administrator to facilitate authentication of devices and the association with an audit-control profile.

FIG. 2 illustrates another audit-control profile 250. Similarly to audit-control profile 200, audit-control profile 250 defines: the system to be audited 252; time-to-live 254, the lifetime of any changes made to audit-control profile 250; step size 256, the size of the incremental changes made to the auditing level; the maximum audit-level 258, the maximum value that the audit setting can be adjusted to; change direction(s) 260, and audit key 264.

Additionally, audit-control profile 250 also defines a minimum audit-level 262. Minimum audit-level 262 is used to allow the audit-level to be decreased by a device, but to prevent auditing from being removed altogether. Audit-control profile 250 also defines audit-adjustment frequency limit 268 which restricts how often the audit-control profile can be modified. This prevents an adversary from continuously adjusting the audit state to maximum in an attempt to execute a DoS attack.

In one embodiment of the present invention, the audit-control profile can consist of an audit-control profile name, an audit key, and a vector of audit-control profiles. In FIG. 2, audit-control profile 290 represents one such "super" audit-control profile. Audit-control profile 290 defines audit-control profile name 292, audit key 298, and two "sub"-audit-control profiles 294 and 296. Audit-control profiles can each independently be applied to a different system or sub-system. Audit-control profiles 294 and 296 are each complete and independent audit-control profiles that are bound together only by shared audit key 298. Sharing audit key 298 implies that any user who has access to audit-control profile 294 also has access to audit-control profile 296.

In a further embodiment of the present invention, audit-control profiles 294 and 296 are not independent. In such an embodiment of the present invention, audit-control profile 294 can base its audit-control profile settings on audit-control profile 296. Furthermore, the audit-level of the system identified by audit-control profile 294 can be affected by audit-control profile 296.

Creating an Audit-Control Profile

Figure 3:
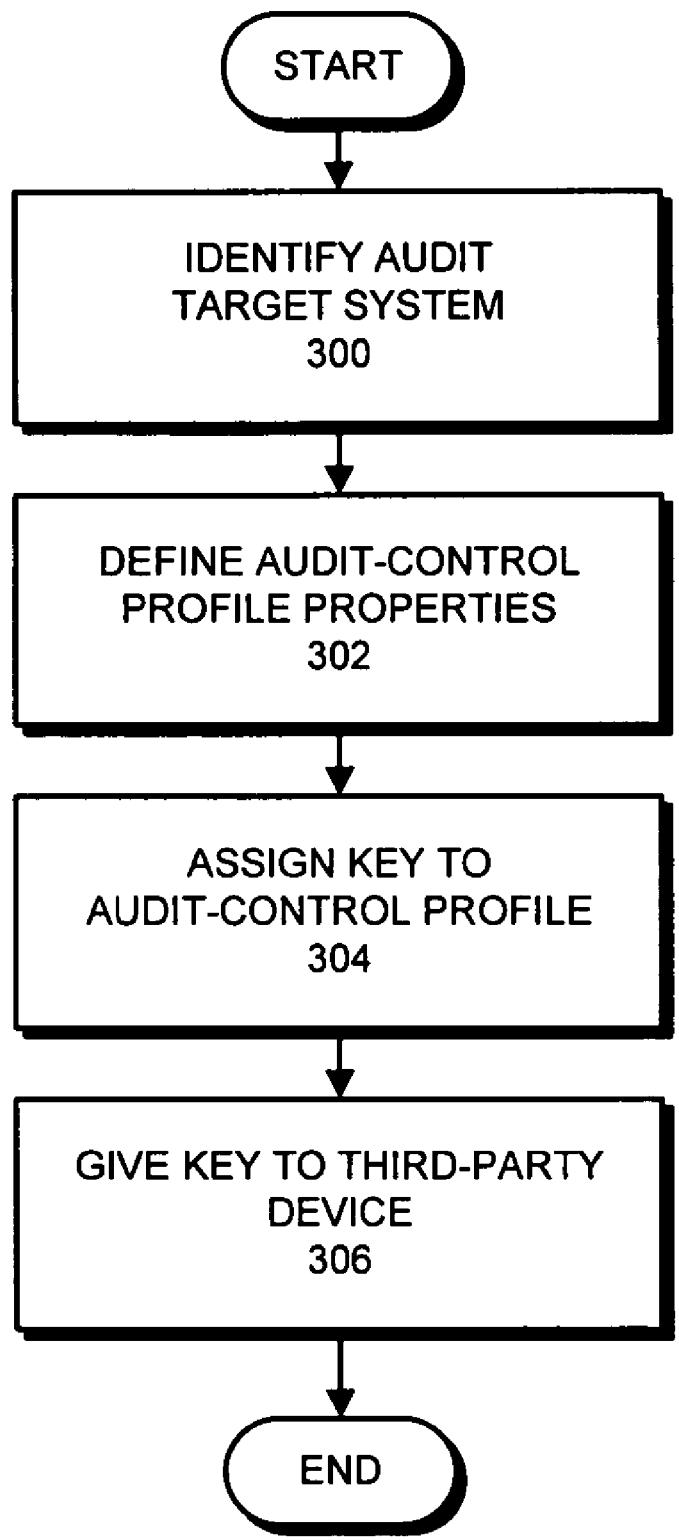
FIG. 3 presents a flowchart illustrating the creation of an audit-control profile in accordance with an embodiment of the present invention.

FIG. 3 presents a flowchart illustrating the creation of an audit-control profile in accordance with an embodiment of the present invention. The process begins with receipt of a selection from an administrator identifying the system to audit (step 300). The properties of the audit-control profile are then defined (step 302). These properties include, but are not limited to, those illustrated in FIG. 2. A key is then assigned to the audit-control profile (step 304). This key is then distributed to a third-party device (step 306).

System Operation

Figure 4:
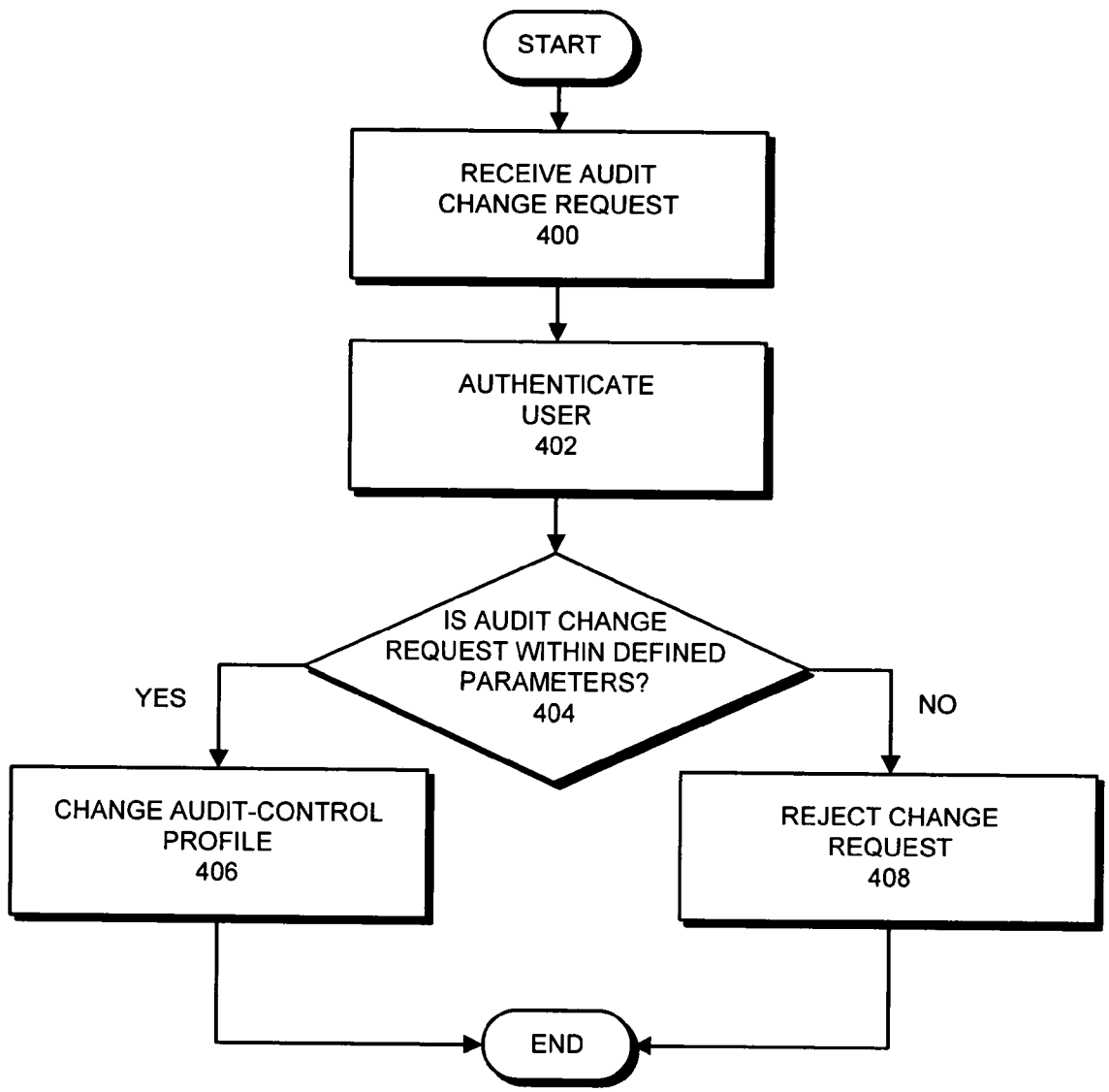
FIG. 4 presents a flowchart illustrating system operation in accordance with an embodiment of the present invention.

FIG. 4 presents a flowchart illustrating system operation in accordance with an embodiment of the present invention. The process begins when the audit system receives an audit change request (step 400). This request can include, but is not limited to, incrementing the audit-level, expanding the scope of systems to be audited and executing a third-party process. The audit system then authenticates the user (step 402). Once authenticated, the system checks to see if the audit change request is within the defined parameters (step 404). If so, the audit system changes the audit-control profile (step 406). If not, the audit change request is rejected (step 408).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating adjustment of an audit state in a computing environment, comprising: receiving a key from a third-party at an audit system implemented in a computer, wherein the key is associated with a corresponding audit-control profile; validating the key, wherein validating the key facilitates authenticating the third-party; identifying the corresponding audit-control profile, wherein the audit-control profile comprises a step size indicating the level of change by which an audit-level can be altered, and a direction indicator indicating whether an audit-level is allowed to be increased, decreased, or both; and auditing a target system in accordance with the corresponding audit-control profile.

2. The method of claim 1, wherein the audit-control profile further specifies one or more of:
   a system to be audited;
   a maximum level to which an audit can be increased;
   a minimum level to which an audit can be decreased;
   a time-to-live indicator, which specifies a maximum lifetime of a change to an audit-control profile;
   a key, which enables change to the audit-control profile; and
   any other audit-control related information.

3. The method of claim 2, wherein the time-to-live indicator can define:
   a period of time;
   a number of operations; or
   any other countable-measure.

4. The method of claim 1, wherein if the key is a master key, the key provides unlimited control over the audit-control profile.

5. The method of claim 1, wherein the third-party is one of:
 an individual;
 a computer system;
 a computer application; and
 a threat detection system.

6. The method of claim 1, wherein the third-party receives the key from an administrator.

7. The method of claim 1; wherein audit-control profile can include a call to execute a third-party process such as an email client to notify an administrator of a modification to the audit-control profile.

8. A computer-readable storage medium storing instructions that when executed by a computer cause the computer to perform a method for facilitating adjustment of an audit state in a computing environment, the method comprising:
 receiving a key from a third-party at an audit system, wherein the key is associated with a corresponding audit-control profile;
 validating the key, wherein validating the key facilitates authenticating the third-party;
 identifying the corresponding audit-control profile, wherein the audit-control profile comprises a step size indicating the level of change by which an audit-level can be altered, and a direction indicator indicating whether an audit-level is allowed to be increased, decreased, or both; and
 auditing a target system in accordance with the corresponding audit-control profile.

9. The computer-readable storage medium of claim 8, wherein the audit-control profile further specifies one or more of:
 a system to be audited;
 a maximum level to which an audit can be increased;
 a minimum level to which an audit can be decreased;
 a time-to-live indicator, which specifies a maximum lifetime of a change to an audit-control profile;
 a key, which enables change to the audit-control profile; and
 any other audit-control related information.

10. The computer-readable storage medium of claim 9, wherein the time-to-live indicator can define:
 a period of time;
 a number of operations; or
 any other countable-measure.

11. The computer-readable storage medium of claim 8, wherein if the key is a master key, the key provides unlimited control over the audit-control profile.

12. The computer-readable storage medium of claim 8, wherein the third-party is one of:
 an individual;
 a computer system;
 a computer application; and
 a threat detection system.

13. The computer-readable storage medium of claim 8, wherein the third-party receives the key from an administrator.

14. The computer-readable storage medium of claim 8, wherein audit-control profile can include a call to execute a third-party process such as an email client to notify an administrator of a modification to the audit-control profile.

15. An apparatus for adjustment of an audit state in a computing environment, comprising:
 a receiving mechanism configured to receive a key from a third-party at an audit system, wherein the key is associated with a corresponding audit-control profile;
 a validation mechanism configured to validate the key, wherein validating the key facilitates authenticating the third-party;
 an identification mechanism configured to identify the corresponding audit-control profile, wherein the audit-control profile comprises a step size indicating the level of change by which an audit-level can be altered, and a direction indicator indicating whether an audit-level is allowed to be increased, decreased, or both; and
 an audit mechanism configured to audit a target system in accordance with the corresponding audit-control profile.

16. The apparatus of claim 15, wherein the audit-control profile further specifies one or more of:
 a system to be audited;
 a maximum level to which an audit can be increased;
 a minimum level to which an audit can be decreased;
 a time-to-live indicator, which specifies a maximum lifetime of a change to an audit-control profile;
 a key, which enables change to the audit-control profile; and
 any other audit-control related information.

17. The apparatus of claim 16, wherein the time-to-live indicator can define:
 a period of time;
 a number of operations; or
 any other countable-measure.

18. The apparatus of claim 15, wherein if the key is a master key, the key provides unlimited control over the audit-control profile.

19. The apparatus of claim 15, further comprising a sending mechanism configured to send the key to the third-party.

20. The apparatus of claim 15, wherein the audit-control profile can include a mechanism configured to execute a third-party process such as an email client to notify an administrator of a modification to the audit-control profile.

* * * * *